Jan. 2, 1934.     C. M. WELLONS     1,941,589

FASTENING FOR GRATINGS

Filed May 3, 1933

Charles M. Wellons
INVENTOR

BY
ATTORNEY

Patented Jan. 2, 1934

1,941,589

UNITED STATES PATENT OFFICE 1,941,589

FASTENING FOR GRATINGS

Charles M. Wellons, Bellevue, Pa.

Application May 3, 1933. Serial No. 669,107

6 Claims. (Cl. 94—30)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to fastenings for securing in place gratings such as are commonly used for walkways.

One of the objects of this invention is to provide a fastening that will securely hold the grating to a support.

Another object of this invention is to provide a fastening which can be readily operated by hand from above to secure or release the grating.

Another object of this invention is to provide a fastening which in its engaged position presents no obstruction on the walking surface of the grating.

Another object of this invention is to provide a fastening which will not work loose.

Another object of this invention is to provide a fastening which is rugged in construction and which will suffer the minimum rate of loss of efficiency when made of material subject to corrosion and exposed to corrosive influences.

Another object of this invention is to provide a fastening which is simple of construction, inexpensive to manufacture and adaptable to various types of gratings and supports.

With these and other objects in view this invention consists in certain novel details of construction, combination and arrangement of parts to be more particularly hereinafter set forth and claimed.

Briefly stated this invention consists of a latch mounted to rotate about a pin secured to the grating and to engage with the under side of the support upon which the grating rests. The position of the pin relative to the support and the shape of the engaging surface of the latch are such that engagement and disengagement are resisted by elastic deformation of the component parts as is described hereafter. The latch is also so shaped that an extended portion of its body forms a lever for manual operation. In the engaged position this extended portion lies below and approximately parallel to the walking surface. Disengagement of the latch is effected by raising this extended portion in rotation about the pin.

Referring more particularly to the accompanying drawing in which corresponding parts are indicated by similar reference characters, Fig. 1 is a plan view of the fastening mounted on a grating of conventional design which is in turn carried upon a support consisting of a structural angle.

The kind of grating to which this invention is particularly applicable consists of a frame work composed of bars and interstices and is commonly used to form a walkway over such openings as are usually formed in the tops of lock walls for machinery recesses or for walkways over lock gates or around machinery in power houses or on shipboard.

Support for the grating is usually provided in the form of an angle, bar or other structural shape upon which the ends of the grating bars bear. The support is fixed more or less permanently in position and it is the object of this invention to provide a means for fastening the grating which is removable to the support which may be regarded as fixed.

The support may be continuously of a shape suitable for engagement with the latches as described herein or sections of a shape suitable for that purpose may be secured to a support that is unsuitable, for example a ledge of concrete or stone masonry, at such intervals as may be necessary for engagement with one or more latches as may be required for fastening the grating.

Since one object of the use of grating as a walkway is to provide a surface that is resistant to slipping and therefore safe to walk upon, it is important that the grating be reliably secured to its supports to form a firm and safe walking surface. In applications such as covers for recesses in the tops of lock walls a grating may be, at times, subjected to disturbing forces such as the flow of turbulent water and may be thereby displaced or lost if it is not adequately secured in place. Also, since a grating may be subjected to repetitions of forces tending to move it, as may result from persons walking upon its surface, or from the action of turbulent water, it is important that the fastening should not tend to become loosened under such influences.

Since another object of the use of gratings as a walkway is to provide a structure that is light in weight relative to its strength and area, and that can therefore be readily handled for removal and replacement, it is important that the fastening be such as can be quickly and conveniently operated to release or secure the grating. Also, since in most applications the space below the grating is inaccessible or inconvenient of access when the grating is in place, it is important that the fastening be operable from above the surface of the grating.

Figure 1:
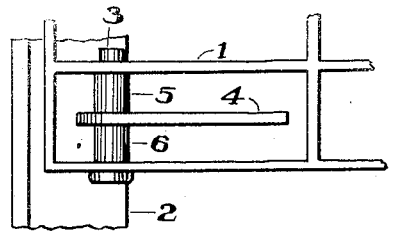
Figure 3:
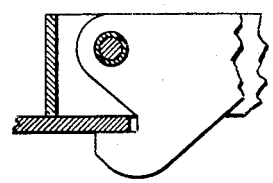
Fig. 3 is a partial side elevation of the latch as in Fig. 2 but with a support consisting of a flat bar or plate.
Figure 2:
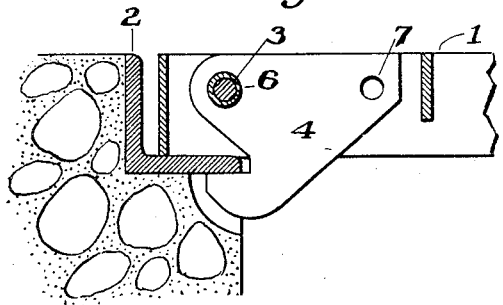
Fig. 2 is a side elevation of the latch showing in section the grating and support, all parts being identical with those in Fig. 1.
Figure 4:
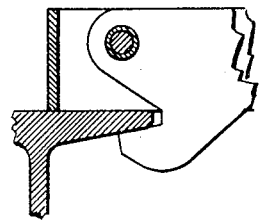
Fig. 4 is a a partial elevation of the latch as in Fig. 2 but with a support consisting of a structural beam in which the surface upon which the latch bears is not parallel to the upper or opposite surface upon which the grating bears.

In the illustrated embodiment characterizing this invention there is shown in Figs. 1 and 2 a grating 1 of conventional design; a support 2 which is in this case a structural angle forming a rabbet at the edge of a concrete wall or recess; a pin 3 passing through two of the grating bars with its axis on a line generally parallel to the edge of the support, a latch of particular shape as described hereinafter, and mounted to rotate upon and in a plane perpendicular to the axis of the pin 3 and tubular spacers 5 and 6 mounted coaxially on the pin 3 for the purpose of maintaining the latch in proper position.

Figure 5:
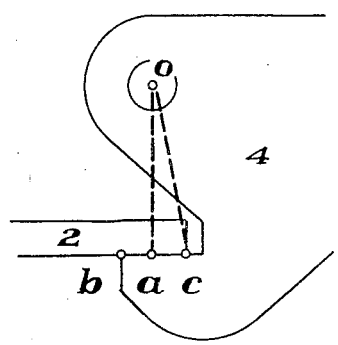
Fig. 5 is a diagram showing positional relations between the component parts.

Fig. 5 shows the essential positional relations between the grating 1, the support 2, the pin 3 and the latch 4 when the grating is resting upon the support and the latch 4 is in the engaged position. The engaging surface of the latch from $b$ to $c$ is in contact with the under side of the support. The line $oa$ passes through the axis of the pin 3 and is perpendicular to the line $bc$ which it intersects between $b$ and $c$. The point $a$ is therefore less distant from the center of rotation $o$ than any other point on the line $bc$. To rotate the latch 4 in a counter clockwise direction, thus releasing its hold, the point $a$ on the latch must pass the point $c$ on the support. Since the distance $oc$ is greater than the distance $oa$, this can be accomplished only through elastic deformation of the parts which in the preferred construction would occur mainly in the pin 3.

Figure 6:
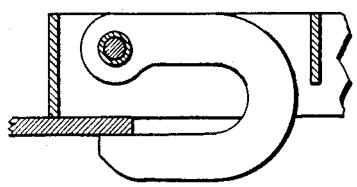
Fig. 6 is a side elevation of a latch differing in form from that shown in Figs. 2, 3, 4 and 5.

In certain cases it may be inexpedient to so construct or arrange the pin as to provide the necessary elastic deformation therein, in which cases I propose to so form the latch that it will provide the necessary elastic deformation. The general form of a latch so constructed is shown in Fig. 6.

The resistance of the pin or other affected parts to elastic deformation provides a force which tends to hold the latch in the engaged position.

The latch is so shaped that a portion of its body is extended laterally to form a lever by which the latch may be manipulated, the said extended portion being so arranged as to lie immediately below and approximately parallel to the walking surface of the grating when the latch is in the closed position. A hole (7) through this extended portion is provided for the insertion of a hook or bar which may be used as an aid to manual operation of the latch.

The latch is also so shaped and proportioned, as may be readily seen from the drawing, that the relation between the position of its center of gravity and its center of rotation about the pin 3 affords a moment arm upon which the weight of the latch acts to maintain it in the engaged position. This construction provides a safeguard against loosening of the fastening, particularly in the case of gratings lying in the horizontal or nearly horizontal position.

In the drawing and foregoing description I have described this invention as applied to gratings. It is my intention that its use shall not be restricted to gratings but to apply it to solid plates or other structures used for similar purposes and in a similar manner to the gratings previously described. In such applications the aperture in which the latch is installed would be fitted with a frame substantially the same as the pertinent section of grating described hereinbefore and the function of the latch would be the same as described.

I have also described and shown the gratings as being placed in a horizontal manner with the top surface lying in a generally horizontal plane and with bottom surface resting upon horizontal supports. While this is the more usual condition of application, it is also my intention that this invention shall be equally applicable for fastening gratings placed vertically or at any angle of inclination to supports of corresponding inclination.

In conclusion, it is evident that this invention provides a simple and reliable device for securing gratings and other structures used as walkways or for similar purposes which will materially contribute to safety and convenience in the use of such structures.

Although in the foregoing certain elements have been described as best adapted to perform the functions allotted to them; neverthtless it is to be understood that various minor changes may be resorted to within the scope of the appended claims without departing from or sacrificing any of the principles of this invention.

Having described my invention, what I claim as new and wish to secure by Letters Patent is:

1. In a walkway of the character described the combination of a support, a grating supported thereby, a pin secured to the said grating and a latch mounted thereon, the said latch being arranged to rotate about the said pin and to engage the under side of the said support, the said latch also having an extended portion which lies approximately parallel to and immediately below the walking surface of the grating when the latch is in the engaged position and which is accessible for manipulation of the latch.

2. In a walkway of the character described the combination of a support, a grating supported thereby, a pin secured to the said grating and a latch mounted thereon, the said latch being arranged to rotate about the said pin and engage the under side of the said support, the said latch also having an extended portion which lies approximately parallel to and immediately below the walking surface of the grating when the latch is in the engaged position and which is accessible for manipulation of the latch, the said latch also being so proportioned that its weight tends to hold it in the engaged position.

3. In a walkway of the character described the combination of a support, a grating supported thereby, a pin secured to the said grating and a latch mounted thereon, the said latch being hinged to rotate in a plane perpendicular to the under surface of the said support and about a point in a line perpendicular to and intersecting the said under surface of the support, the said latch having an engaging surface which in the engaged position is parallel to the said under surface of the support.

4. In a walkway of the character described the combination of a support, a grating supported thereby, a pin secured to the said grating and a latch mounted thereon, the said latch being hinged to rotate in a plane perpendicular to the under surface of the said support and about a point in a line perpendicular to and intersecting the said under surface of the support, the said latch having an engaging surface which in the engaged position is parallel to and in contact with the said under surface of the support.

5. In a walkway of the character described the combination of a support, a grating supported thereby, a pin secured to the said grating and a latch mounted thereon, the said latch being hinged to rotate in a plane perpendicular to the under surface of the said support and about a point in a line perpendicular to and intersecting the said under surface of the support, the said latch having an engaging surface which in the engaged position is parallel to and in contact with the said under surface of the support, the said latch also having an extended portion which when in the engaged position lies approximately parallel to and immediately below the walking surface and is accessible for manipulation of the latch.

6. In a walkway of the character described the combination of a support, a grating supported thereby, a pin secured to the said grating and a latch mounted thereon, the said latch being hinged to rotate in a plane perpendicular to the under surface of the said support and about a point in a line perpendicular to and intersecting the said under surface of the support, the said latch having an engaging surface which in the engaged position is parallel to and in contact with the said under surface of the support, the said latch also having an extended portion which when in the engaged position lies approximately parallel to and immediately below the walking surface and is accessible for manipulation of the latch, the said latch also being so proportioned that its weight tends to hold it in the engaged position.

CHARLES M. WELLONS.